US012560672B2

(12) United States Patent
Xu et al.

(10) Patent No.: US 12,560,672 B2
(45) Date of Patent: Feb. 24, 2026

(54) POSITIONING CALIBRATION METHOD AND SYSTEM, AND STORAGE MEDIUM

(71) Applicant: PURPLE MOUNTAIN LABORATORIES, Jiangsu (CN)

(72) Inventors: Jia Xu, Jiangsu (CN); Xiaodong Li, Jiangsu (CN); Wangdong Qi, Jiangsu (CN); Yongming Huang, Jiangsu (CN); Yi Guo, Jiangsu (CN); Shaolei Wang, Jiangsu (CN)

(73) Assignee: PURPLE MOUNTAIN LABORATORIES, Jiangsu (CN)

( * ) Notice: Subject to any disclaimer, the term of this patent is extended or adjusted under 35 U.S.C. 154(b) by 289 days.

(21) Appl. No.: 18/288,174

(22) PCT Filed: Sep. 10, 2021

(86) PCT No.: PCT/CN2021/117763
§ 371 (c)(1),
(2) Date: Oct. 24, 2023

(87) PCT Pub. No.: WO2022/227369
PCT Pub. Date: Nov. 3, 2022

(65) Prior Publication Data
US 2024/0219507 A1 Jul. 4, 2024

(30) Foreign Application Priority Data
Apr. 26, 2021 (CN) .......................... 202110451103.X

(51) Int. Cl.
G01S 5/02 (2010.01)

(52) U.S. Cl.
CPC ............ G01S 5/021 (2013.01); G01S 5/0264 (2020.05); G01S 5/0294 (2013.01)

(58) Field of Classification Search
CPC ....... G01S 5/021; G01S 5/0264; G01S 5/0294
(Continued)

(56) References Cited

U.S. PATENT DOCUMENTS

| | | | |
|---|---|---|---|
| 10,698,118 B1 | 6/2020 | Varoglu | |
| 2020/0349844 A1* | 11/2020 | Rosenzweig | ......... G01S 13/931 |
| 2021/0179092 A1* | 6/2021 | Chen | .................... B60W 10/04 |

FOREIGN PATENT DOCUMENTS

| | | |
|---|---|---|
| CN | 101361660 A | 2/2009 |
| CN | 102200578 A | 9/2011 |

(Continued)

OTHER PUBLICATIONS

The Search Report of counterpart CN application No. 202110451103.X issued on Jun. 22, 2021.

*Primary Examiner* — Harry K Liu
(74) *Attorney, Agent, or Firm* — The Sun IP Law

(57) ABSTRACT

Provided are a positioning calibration system and method, and a storage medium. The positioning calibration system includes a movable platform (100) and a background processing device (200). The movable platform (100) includes a movable apparatus (110), and a positioning component (120) and a data processing apparatus (130); the positioning module (120) includes at least two different types of positioning sensors (121); the data processing apparatus (130) is configured to acquire wireless positioning information of the movable platform (100) in real time and acquire the original calibration information; the wireless positioning information and the original calibration information both include a position coordinate of the movable platform (100) with a corresponding time stamp when the position coordinate is acquired; the background processing device (200) includes a storage module (210) and a positioning trajectory demonstration module (220).

16 Claims, 3 Drawing Sheets

(58) Field of Classification Search
USPC .......................................................... 342/451
See application file for complete search history.

(56)                          References Cited

FOREIGN PATENT DOCUMENTS

| | | | | | |
|---|---|---|---|---|---|
| CN | 103152818 | A | | 6/2013 | |
| CN | 104469677 | A | | 3/2015 | |
| CN | 104515518 | A | | 4/2015 | |
| CN | 106205136 | A | | 12/2016 | |
| CN | 108235735 | A | | 6/2018 | |
| CN | 108983272 | A | | 12/2018 | |
| CN | 109143162 | A | | 1/2019 | |
| CN | 109471134 | A | | 3/2019 | |
| CN | 110967032 | A | * | 4/2020 | ......... G01C 21/3446 |
| CN | 111521971 | A | | 8/2020 | |
| CN | 111735458 | A | | 10/2020 | |
| CN | 112986908 | A | | 6/2021 | |
| CN | 112986908 | B | * | 8/2021 | ........... G01S 5/0264 |
| DE | 102018204704 | A1 | * | 10/2019 | ........... G06Q 10/087 |
| DE | 112020006966 | T5 | * | 1/2023 | ............. G06V 20/58 |
| EP | 2449411 | B1 | * | 1/2021 | ........ G01S 5/02695 |
| EP | 4036599 | A1 | * | 8/2022 | ............. G06T 7/246 |
| JP | 2011211687 | A | | 10/2011 | |
| WO | WO-2020225226 | A1 | * | 11/2020 | ............. H04W 4/44 |

* cited by examiner

POSITIONING CALIBRATION METHOD AND SYSTEM, AND STORAGE MEDIUM

TECHNICAL FIELD

The disclosure relates to the technical field of positioning, and in particular, to a positioning calibration method and system, and a storage medium.

BACKGROUND

High-accuracy positioning services are key support services in emerging information industries such as Internet of Vehicles, Internet of Things, and Industrial Internet, for example, driverless cars, vehicle management, position information query, intelligent handling robots, location dating, navigation, etc. In the future, there will be a huge number of intelligent Internet connection terminals that require real-time, reliable and accurate positioning, so as to realize functions thereof.

In outdoor open areas, satellite navigation systems represented by GPS and BeiDou, and enhancement technologies thereof provide accurate and universal navigation and positioning services. However, in indoor and urban environments, the performance of the satellite navigation systems decreases significantly or even fails due to the fact that signals are susceptible to masking. For example, for special scenarios such as parking lots, airports, and large indoor stores and supermarkets, the satellite navigation systems are unable to accurately position. Thus, current positioning measurement systems use new technologies such as wireless communication signals (including mobile communication base stations, ultra-wideband, Wi-Fi, Bluetooth, etc.) to accurately position movable objectives. The positioning measurement system often needs a positioning calibration system with more accurate positioning performance to calibrate positioning results of the positioning measurement system, so as to verify the accuracy and reliability of the positioning measurement system. For example, the positioning accuracy of the positioning calibration system is at the millimeter level, and the positioning accuracy of the positioning measurement system is at the centimeter level. In the same test environment, the effectiveness and accuracy of a new research positioning technology may be verified by comparing the positioning results of the positioning calibration system with those of the positioning measurement system. Therefore, it is very important to establish a positioning calibration system with strong real-time performance, high reliability and excellent extendibility.

SUMMARY

The disclosure provides a positioning calibration system and method, and a storage medium.

A first aspect of the disclosure provides a positioning calibration system, which includes a movable platform and a background processing device. The movable platform includes a movable apparatus, and a positioning component and a data processing apparatus, which are arranged on the movable apparatus. The positioning component includes at least two different types of positioning sensors, and the positioning sensors are configured to acquire original calibration information of the movable platform in real time. The data processing apparatus is connected to the positioning component. The data processing apparatus is configured to acquire wireless positioning information of the movable platform in real time and acquire the original calibration information. The wireless positioning information and the original calibration information both include a position coordinate of the movable platform with a corresponding time stamp when the position coordinate is acquired.

The background processing device is communicatively connected to the data processing apparatus by means of a wireless large-bandwidth transmission channel. The background processing device includes a storage module and a positioning trajectory demonstration module. The storage module is connected to the positioning trajectory demonstration module. The storage module is configured to store the original calibration information and the wireless positioning information. The positioning trajectory demonstration module is configured to generate a dynamic trajectory of the movable platform on a virtual map according to the original calibration information and the wireless positioning information.

A second aspect of the disclosure provides a positioning calibration method. The method includes the following operations.

Original calibration information and wireless positioning information of a movable objective are acquired in real time. The original calibration information is obtained by at least two different types of positioning sensors; and the wireless positioning information and the original calibration information both comprise position coordinate of the movable objective with corresponding time stamp when the position coordinate is acquired.

A dynamic trajectory of the movable objective on a virtual map is generated according to the original calibration information and the wireless positioning information.

A third aspect of the disclosure provides a storage medium. The storage medium stores a computer program. Steps of the method described in any one of the above are implemented when the computer program is executed by a processor.

The details of one or more embodiments of the present disclosure are set forth in the drawings and the description below. Other features, objectives and advantages of the present disclosure will be apparent from the drawings and the claims from the specification.

Figure 1:
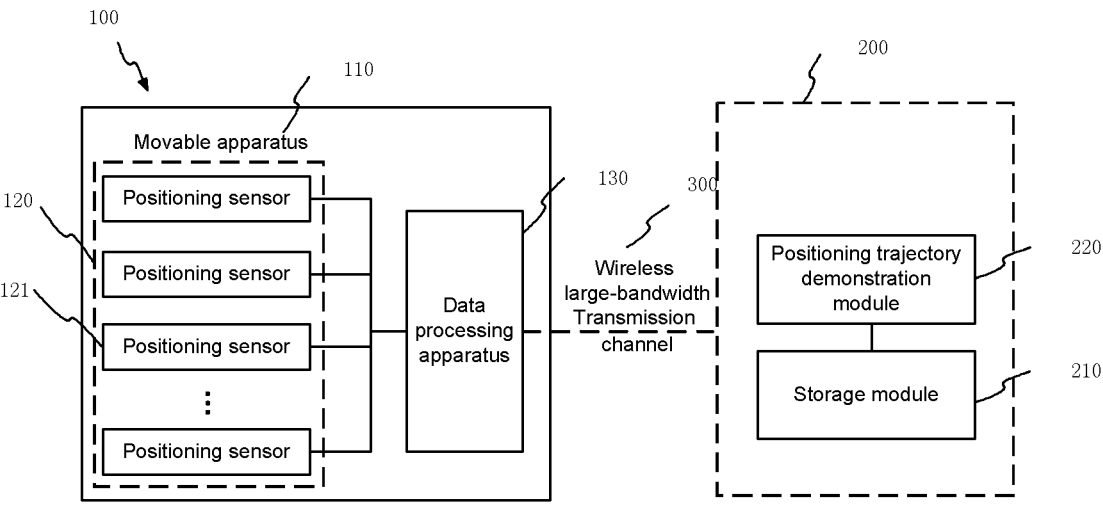
FIG. 1 is a structural block diagram of a positioning calibration system according to an embodiment.

100. Movable platform; 110. Movable apparatus; 120. Positioning component; 121. Positioning sensor; 130. Data processing apparatus; 131. Industrial personal computer; 132. Fusion positioning module; 133. First data transmission module; 200. Background processing device; 210. Storage module; 220. Positioning trajectory demonstration module; 230. Positioning module; 240. Second data transmission module; 250. Scheduling module; 260. 5G data processing module; 300.

Wireless large-bandwidth transmission channel; 310. 5G communication wireless transmission channel.

DETAILED DESCRIPTION OF THE EMBODIMENTS

To make the targets, technical solutions and advantages of the disclosure clearer, the disclosure is further described in detail below with reference to the drawings and embodiments. It should be understood that the specific embodiments described here are merely used to explain the disclosure, and are not used to limit the disclosure.

At present, an outdoor mainstream positioning technology mainly includes satellite navigation systems represented by GPS and BeiDou and enhancement technologies thereof; and an indoor positioning mainstream means mainly includes a laser radar means, a two-dimensional code means, and the like. Due to limitations to the hardware performance and environment feature values of a positioning component, a conventional positioning calibration system prefers a unique positioning scenario or a unique positioning environment. For example, an image recognition-based calibration system uses a camera, a laser radar working diagram and the like to acquire image information of roads and building materials, to perform feature recognition on heights and lengths and the like, so as to establish a calibration system. However, as the calibration system varies with light rays and environments, the clarity of images also changes, such that it is friendly for calibration of fixed scenarios, and it is disadvantageous for calibration of dynamic scenarios. For another example, a virtual beacon-based vehicle positioning calibration system for rail transit signal products uses a plurality of sensors to synchronously collect, sense and fuse, as to calculate the position of a vehicle device in real time. The beacon objectives having different features are arranged by the sides of train operation tracks. A calibration system is established by using the sensing of feature changes of the beacon objective. However, such positing calibration system is more suitable for the positioning of special scenarios such as tracks, resulting in poor universality.

An embodiment of the disclosure provides a positioning calibration system. Measurement results of a positioning measurement system may be verified by means of the positioning calibration system, that is, the calibration of the positioning measurement system is realized. Currently, since the positioning measurement system such as a satellite navigation system cannot perform accurately positioning in environments such as indoors or in urban areas, in order to solve the problem, a new positioning measurement system such as the positioning measurement system based on a wireless communication signal is used for positioning. However, due to limitations to the hardware performance of a positioning component and the environment feature values which the positioning component is able to be adapted, the current positioning calibration system prefers a unique positioning scenario or a unique positioning environment, and has poor universality, such that the positioning measurement system cannot be calibrated in various environments. Therefore, the current positioning calibration system is not applicable to special scenarios, such that effective verification cannot be performed on the measurement results of the new positioning measurement system. The positioning calibration system provided in the present solution can well solve the above problems.

FIG. 1 is a structural block diagram of a positioning calibration system according to an embodiment. As shown in FIG. 1, the positioning calibration system includes a movable platform 100 and a background processing device 200. The movable platform 100 includes a movable apparatus 110, and a positioning component 120 and a data processing apparatus 130, which are arranged on the movable apparatus 110.

A moving mode of the movable apparatus 110 is not limited. The movable apparatus may be moved through autonomous navigation, or may be moved through a manual operation. A moving direction of the movable apparatus 110 is not limited. The movable apparatus may be moved horizontally and laterally, may be moved vertically and longitudinally, or may be moved rotatably. The size and appearance structure of the movable apparatus 110 are not limited, and are configured according to actual requirements. The movable platform 100 may support a long-time stable path navigation function, can cover climbing scenarios with the ratio of the height to length not more than 20%, and may also have the function of automatic obstacle avoidance or detouring without terminating a navigation task. The movable apparatus 110 may be powered on in various manners such as wired charging, wireless charging, and storage battery power supply. In some examples, the movable apparatus 110 may include a moving base plate (for example, a moving base plate with wheels), so as to move on the ground. In some other examples, the movable apparatus 110 may further include an unmanned aerial vehicle, and the unmanned aerial vehicle is provided with rotors, so as to move in the air. In some other examples, the movable apparatus 110 may further include a rotatable apparatus, which may be fixed on a driverless car and a handling robot; a measurement angle of the positioning component 120 may be changed by means of the rotatable apparatus; and the positioning of the driverless car and the handling robot is calibrated by taking the driverless car and the handling robot as movable objectives.

The positioning component 120 and the data processing apparatus 130 both are arranged on the movable apparatus 110, such that the positioning component 120 and the data processing apparatus 130 are moved with the moving of the movable apparatus 110. The positioning component 120 includes at least two different types of positioning sensors 121. For example, the positioning sensors 121 may be sensors for positioning measurement, such as an Ultra Wide Band (UWB) sensor, an Inertial Measurement Unit (IMU) sensor, a differential sensor, a video sensor, a Bluetooth sensor, a wireless communication (Wi-Fi) sensor, a laser radar, and a satellite navigation component. The laser radar may be a single-line laser radar, or may be a multi-line laser radar. The positioning sensors 121 are configured to acquire original calibration information of the movable platform 100 in real time. The original calibration information includes the position coordinate of the movable platform 100 and the corresponding time stamp when the position coordinates is obtained, such that time may correspond to the positioning coordinate, and the position coordinates of the movable platform 100 at different times are cleared. Since there may be a difference in the measurement accuracy of different positioning sensors 121, the position coordinates of the movable platform 100 that are detected by each positioning sensor 121 at the same time may be the same after being converted into the same coordinate system, and there may be a certain difference. There may be one or a plurality of the positioning sensors 121 of the same type in the positioning component 120. Different positioning sensors 121 may be respectively located at appropriate positions on the movable apparatus 110, so as to adapt measurement characteristics of different positioning sensors 121. In addition, the positioning sensors 121 are easily detached from the movable apparatus 110, so as to change the positions of the positioning sensors 121 on the movable apparatus 110, or new positioning sensors 121 are added, or the unwanted positioning sensors 121 are removed.

The data processing apparatus 130 is connected to the positioning component 120. As an example, the data processing apparatus 130 is connected to each positioning sensor 121 in the positioning component 120. The data processing apparatus 130 is configured to acquire wireless positioning information of the movable platform 100 in real time and acquire the original calibration information of the movable platform 100 that is obtained by each positioning sensor 121 in real time. The data processing apparatus 130 may be provided with a wireless communication positioning device, so as to acquire the wireless positioning information of the movable platform 100 in real time. The wireless positioning information may include the position coordinate of the movable platform 100 and the corresponding time stamp when the position coordinate is acquired, such that time may correspond to the positioning coordinate, and the position coordinate of the movable platform 100 at different times are cleared. At the same time, there may be still a certain difference between the position coordinates of the movable platform 100 that are measured by each positioning sensor 121 and the wireless communication positioning device in different measurement manners and converted into the same coordinate system.

In some examples, the data processing apparatus 130 may include a data processing unit and a data receiving and forwarding unit. The data processing unit and the data receiving and forwarding unit both are directly or indirectly communicatively connected to the background processing device 200. The data receiving and forwarding unit may be communicatively connected to the data processing unit in a wired or wireless manner. The data processing unit may include one or a plurality of servers. The data processing unit is configured to receive, process and forward the original calibration information acquired by each positioning sensor 121. The data receiving and forwarding unit is configured to realize a data transmission between the data processing unit and the background processing device 200. In other examples, the data receiving and forwarding unit and the data processing unit may be integrated.

The background processing device 200 is communicatively connected to a data processing module by means of a wireless large-bandwidth transmission channel 300. The wireless large-bandwidth transmission channel 300 is, for example, a transmission channel of a 5G network, a transmission channel of a wifi network, or the like. For example, the background processing device 200 may be communicatively connected to the data processing module by means of 5G and Wi-Fi, so as to realize data exchange. The background processing device 200 may include one or a plurality of servers. The server is configured to construct a scheduling system, a storage system, a positioning trajectory demonstration system, and the like. The background processing device 200 includes a storage module 210 and a positioning trajectory demonstration module 220. The storage module 210 may be communicatively connected to the data processing apparatus 130, and may also be connected to the positioning trajectory demonstration module 220. The storage module 210 is configured to store, including but not limited to, the original calibration information and the wireless positioning information. The positioning trajectory demonstration module 220 is configured to generate a dynamic trajectory of the movable platform 100 according to the original calibration information and the wireless positioning information, and display the dynamic trajectory on a virtual map.

In some examples, the storage module 210 may be local memory. The local memory and the positioning trajectory demonstration module 220 may be arranged on the same server, or may be arranged on different servers. When the local memory and the positioning trajectory demonstration module 220 are arranged on different servers, the servers are communicatively connected to each other. In other examples, the storage module 210 may be a wireless database that is deployed on a private cloud. By means of account management, a data interface is opened, such that data such as the original calibration information and the wireless positioning information may be stored in the wireless database, and various data stored in the wireless database is acquired from the wireless database, thereby supporting continuous improvement of a positioning research platform.

In some examples, the storage module 210 may store data generated by different positioning technologies to statistical files that are named by the positioning technology names, such as "laser radar.xls", "Bluetooth.xls", and the like. When there are a plurality of positioning sensors 121 of the same type, the statistical files may be labeled with serial numbers, for example, "laser radar 1.xls" and "laser radar 2.xls". Each file may include a time stamp, a positioning coordinate result, original measurement data, and a positioning coordinate system. In an example, each file uses the following data formats.

| Time stamp | Positioning coordinate result | Original measurement data | Positioning coordinate system |
| --- | --- | --- | --- |

The data format may be customized according to requirements, and a user may rapidly acquire required data by filtering file names and the time stamps.

When one positioning technology is added into the storage module 210 each time, the positioning trajectory demonstration module 220 is notified to adaptively add a corresponding technology name. Corresponding coordinate system information is forwarded to the positioning trajectory demonstration module 220. Meanwhile, the positioning trajectory demonstration module 220 synchronously adds a corresponding coordinate system conversion standard.

For each positioning sensor 121, the position coordinate in the original calibration information measured by the positioning sensor 121 is the original measurement data; and for the wireless communication positioning device, the position coordinate in the wireless positioning information is the original measurement data. The time stamp corresponds to the original measurement data. The format of the original measurement data may be set according to actual requirements. Researchers may rapidly acquire the required data by means of methods of filtering the file names and the time stamps. The positioning coordinate system may be the coordinate system of original measurement. For example, the positioning coordinate system of each positioning sensor 121 may be the coordinate system that uses the center of each positioning sensor 121 as an original point. The positioning coordinate result may be coordinate after the original measurement data is converted into the same coordinate system. The converted same coordinate system may be set according to actual requirements. The time unit of the time stamps may be superior to a millisecond level, so as to achieve real-time dynamic positioning.

In some examples, the positioning trajectory demonstration module 220 converts the position coordinate in each original calibration information and the wireless positioning information into coordinate in the same coordinate system, and stores data, which is converted to the same coordinate system, into the storage module 210. The positioning trajectory demonstration module 220 may also has a map function, for example, can simulate roads or other obstacles. As an example embodiment, a map may be stored in the storage module 210. The positioning trajectory demonstration module 220 acquires the map from the storage module 210, and establishes, according to the acquired map, a virtual map where the movable platform 100 is currently located. Alternatively, the positioning sensor 121 may also at least include the video sensor. The positioning trajectory demonstration module 220 establishes, according to an image detected by the video sensor, the virtual map where the movable platform 100 is currently located.

In a first example, the positioning trajectory demonstration module 220 may respectively generate one or a plurality of dynamic trajectories of the movable platform 100 according to the original calibration information detected by one or more of the positioning sensors 121. In a second example, the positioning trajectory demonstration module 220 may generate the dynamic trajectory of the movable platform 100 according to the wireless positioning information. In a third example, the positioning trajectory demonstration module 220 may first obtain more accurate positioning information of the movable platform 100 according to the original calibration information detected by each positioning sensor 121. For example, more accurate original calibration information detected by each positioning sensor 121 at each period of time is selected as the more accurate positioning information of the movable platform 100, or the average value of coordinates in the original calibration information detected by each positioning sensor 121 is calculated as the more accurate positioning information of the movable platform 100. The positioning trajectory demonstration module 220 may generate the dynamic trajectory of the movable platform 100 according to the more accurate positioning information of the movable platform 100. In a fourth example, the positioning trajectory demonstration module 220 may first obtain the more accurate positioning information of the movable platform 100 according to the original calibration information and the wireless positioning information detected by each positioning sensor 121, and then generate the dynamic trajectory of the movable platform 100 according to the more accurate positioning information of the movable platform 100. The dynamic trajectories of the movable platform 100 that are generated in the examples are respectively displayed on the virtual map, and the dynamic trajectories in the embodiments may be displayed in any combination, such that an operator may intuitively learn the position of the movable platform 100 during moving, and obstacles around the movable platform.

Since the positioning technology names and the coordinate system conversion standard are added to the positioning trajectory demonstration module 220, the user may select single or multiple positioning names, and the virtual map established by the positioning trajectory demonstration module 220 may display a real-time positioning dynamic trajectory of the current movable platform 100. In some embodiments, the dynamic trajectories of a plurality of movable platforms 100 currently online may be displayed at the same time. Alternatively, the user may also selectively watch the dynamic trajectories of one or more movable platforms 100.

The positioning trajectory demonstration module 220 may be various types of displays. In some examples, the positioning trajectory demonstration module 220 may include a display screen, such that each dynamic trajectory of the movable platform 100 on the virtual map is displayed on the display screen. In some other embodiments, the positioning trajectory demonstration module 220 may include a VR device, such that the VR device virtually displays the dynamic trajectory of the movable platform 100 on the virtual map.

In some examples, the positioning trajectory demonstration module 220 may display the dynamic trajectory of the movable platform 100 on the virtual map in real time. In some other examples, the positioning trajectory demonstration module 220 may also support a playback function, so as to display the historical dynamic trajectory of the movable platform 100 on the virtual map.

The dynamic trajectory of the movable platform 100 provided in this embodiment may be configured to verify the accuracy of the wireless positioning information obtained by the wireless communication positioning device, so as to calibrate the wireless communication positioning device. Each dynamic trajectory of the movable platform 100 may also be configured to verify the accuracy of the positioning information obtained by other positioning measurement systems, so as to calibrate other positioning measurement systems.

The positioning calibration system uses the movable platform 100 as a positioning terminal. The positioning component 120 includes a plurality of positioning sensors 121 of different types, such that the universality of the positioning calibration system is improved, and the new positioning measurement system can be calibrated under various scenarios. In particular, when the positioning component 120 simultaneously includes the positioning sensors 121 such as the laser radar suitable for indoor positioning, and the positioning sensors 121 such as the satellite navigation module suitable for outdoor positioning, the positioning calibration system can cover indoor positioning environments, outdoor positioning environments, or positioning environments switching between indoor and outdoor, such that the positioning calibration system is wide in covering range. In addition, the positioning calibration system uses the latest wireless large-bandwidth technology to rapidly transmit massive original measurement data, the wireless positioning information including the time stamps, and the original calibration information of each positioning sensor 121 including the time stamps are acquired in real time, such that real-time dynamic calibration of the positioning measurement system is realized. Furthermore, by configuring the storage module 210 as a wireless database of the cloud, data sharing is realized, such that the positioning research platform is improved. In addition, data formats measured by different positioning technologies are inconsistent, and data volumes measured within the same time are also different. In this embodiment, position coordinate measured by different positioning technologies may be converted into the coordinate in the same coordinate system and converted into the same format. The dynamic trajectory of the movable platform 100 is generated according to data of each positioning technology, such that measurement accuracy of each positioning technology in different environments is intuitively analyzed, thereby achieving efficient calibration of the positioning measurement system.

In an embodiment, the data processing apparatus 130 is further configured to fuse the original calibration information obtained by each positioning sensor 121, so as to obtain fusion calibration information. The fusion calibration information includes the position coordinate of the movable platform 100 and the corresponding time stamp when the position coordinate is acquired. Fusion processing may be any technology in traditional technologies well-known by a person skilled in the art, and is not described herein again. The position coordinate in the fusion calibration information obtained after fusion processing is more accurate than the position coordinate in the original calibration information detected by each positioning sensor 121; and the accuracy of the position coordinate in the fusion calibration information is at least an order of magnitude higher than the position coordinate in the wireless positioning information.

The storage module 210 is further configured to store the fusion calibration information. The positioning trajectory demonstration module 220 is configured to generate and display at least one of a first dynamic trajectory, a second dynamic trajectory, and a third dynamic trajectory of the movable platform 100 on the virtual map. Position coordinate systems of the movable platform 100 of the first dynamic trajectory, the second dynamic trajectory, and the third dynamic trajectory are all the same coordinate system, facilitating comparison of differences between the dynamic trajectories. The first dynamic trajectory is generated according to the original calibration information measured by each positioning sensor 121. The second dynamic trajectory is generated according to the fusion calibration information. The third dynamic trajectory is generated according to the wireless positioning information.

The background processing device 200 may be configured with a target server group. The positioning trajectory demonstration module 220 may include part of or all of software programs in the target server group, or may further include hardware structure such as a display screen of the target server group. The operator may output a requirement command to the positioning trajectory demonstration module 220 by means of input devices such as a keyboard, a mouse, and a touch screen; and the positioning trajectory demonstration module 220 generates any one of the first dynamic trajectory, the second dynamic trajectory, and the third dynamic trajectory according to the requirement command. The positioning accuracy of the second dynamic trajectory is higher than that of the first dynamic trajectory and the third dynamic trajectory, such that the second dynamic trajectory may be configured to calibrate the wireless communication positioning device, or may further be configured to analyze the positioning accuracy of the positioning sensors 121 in the positioning component 120.

In other embodiments, the data processing apparatus 130 may further be configured to fuse the wireless positioning information and the original calibration information detected by each sensor, so as to obtain the fusion calibration information. The fusion calibration information includes position coordinate information and the time stamp. In this embodiment, the wireless positioning information is also taken as calibration information of the positioning calibration system, so as to improve the accuracy of the position coordinate in the fusion calibration information. The accuracy of the dynamic trajectory, which is obtained by the positioning trajectory demonstration module 220 according to the fusion calibration information, of the movable platform 100 on the virtual map is relatively high, such that the fusion calibration information may be configured to calibrate other positioning measurement systems.

In an embodiment, the positioning trajectory demonstration module 220 is further configured to generate and display a positioning error distribution curve according to the original calibration information, the fusion calibration information, and the wireless positioning information. In other embodiments, the positioning trajectory demonstration module 220 is further configured to enlarge a preset position on the virtual map. The positioning error distribution curve may represent ranging error conditions during the positioning of the positioning sensors 121 and the wireless communication positioning device. When a plurality of dynamic trajectories of the same movable platform 100 are displayed on the virtual map, the positioning trajectory demonstration module 220 may automatically position, enlarge and display the portion of the virtual map where there are large differences between the dynamic trajectories; or the positioning trajectory demonstration module 220 may also enlarge a specified position on the virtual map according to the requirement command that is inputted by the operator by means of an input device. An enlargement ratio may be adjusted according to actual requirements.

Figure 2:
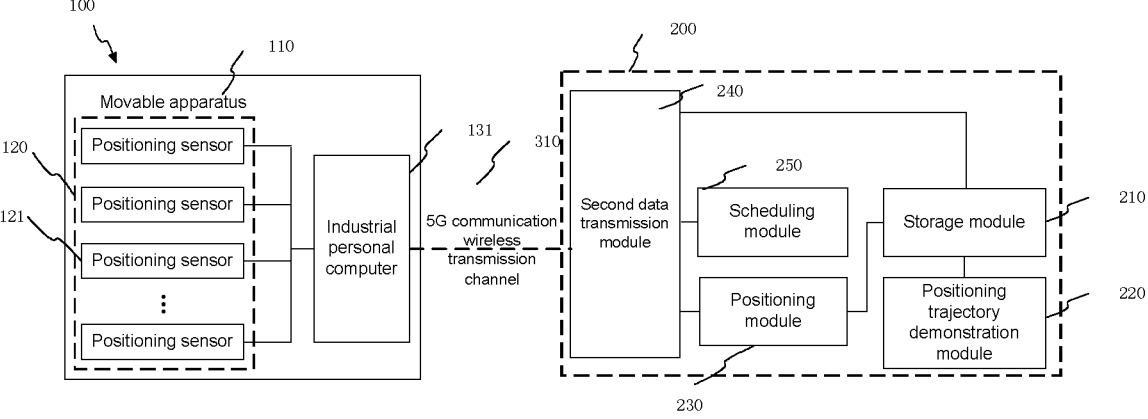
FIG. 2 is a structural block diagram of a positioning calibration system according to another embodiment.

In an embodiment, as shown in FIG. 2, the data processing apparatus 130 includes an industrial personal computer 131. The industrial personal computer 131 is provided with a data interface and a 5G unit. The industrial personal computer 131 is connected to the positioning sensors 121 by means of the data interface, such that the industrial personal computer 131 may receive, by means of the data interface, in real time, the original calibration information measured by the positioning sensors 121. The industrial personal computer 131 is configured to fuse the original calibration information of the movable platform 100 that is detected by the positioning sensors 121 in real time, so as to obtain the fusion calibration information. The accuracy of the position coordinate in the fusion calibration information is relatively high, and at least an order of magnitude higher than that of the position coordinates in the wireless positioning information. Each position coordinate in the fusion calibration information may carry the time stamp superior to the millisecond level, such that the time may correspond to the position coordinate of the movable platform 100, thereby achieving the dynamic positioning of the movable platform 100.

The 5G unit may include a 5G Subscriber Identity Module (SIM) card. The industrial personal computer 131 is provided with a corresponding card groove, and then the 5G SIM card is integrated on the industrial personal computer 131. The wireless large-bandwidth transmission channel 300 is a 5G communication wireless transmission channel 310. In this embodiment, the industrial personal computer 131 can be used as a 5G terminal at the same time, and can access a 5G network. The industrial personal computer 131 performs data processing as a data processing unit in an output processing apparatus. The 5G unit is integrated on the industrial personal computer 131 as the data receiving and forwarding unit.

The background processing device 200 further includes a second data transmission module 240 and a positioning module 230. The second data transmission module 240 may be a 5G signal receiving and forwarding device, for example, may refer to a 5G core network or a 5G base station. The second data transmission module 240 can successfully establish a 5G cell, and form the 5G communication wireless transmission channel 310 with the 5G terminal (which is the industrial personal computer 131 in this embodiment), so as to achieve a large-bandwidth wireless communication. The second data transmission module 240 is communicatively connected to the 5G unit, and is communicatively connected to the positioning module 230 and the storage module 210. The industrial personal computer 131 is further configured to send a 5G uplink channel sounding signal (which may also be called a channel Sounding Reference Signal (SRS)) to the second data transmission module 240; and when the industrial personal computer 131 sends the 5G uplink channel sounding signal, a 3GPP standard protocol may be followed. The positioning module 230 obtains the wireless positioning information according to the 5G uplink channel sounding signal. The wireless positioning information in this embodiment is obtained on the basis of a 5G signal positioning technology. Wireless positioning may use a central point of the industrial personal computer 131 as a positioning target, that is, the position coordinate in the wireless positioning information may be the coordinate of the central point of the industrial personal computer 131. In this embodiment, when the industrial personal computer 131 fuses the original calibration information detected by the positioning sensors 121 to obtain the fusion calibration information, a calibrated positioning objective may be the center of the industrial personal computer 131, so as to cause a calibration center to be kept consistent with a wireless positioning center.

The positioning trajectory demonstration module 220 displays the dynamic trajectory of the movable platform 100 according to actual requirements, wherein the dynamic trajectory of the movable platform 100 is generated according to different positioning technologies. For example, a trajectory of which positioning accuracy in the positioning calibration system is the highest may be taken as a calibration trajectory a, a trajectory positioned by a new research 5G signal is taken as a trajectory b, and a trajectory positioned by a multi-line laser radar is taken as a trajectory c. Visualization results of data comparisons can be intuitively and clearly acquired on the basis of the same time, the same environment, and the same objective. The positioning trajectory demonstration module 220 may further support scale-configurable "enlargement" on the positioning results at the differences between the dynamic trajectories, and support generation of a ranging error distribution curve and the positioning error distribution curve, such that elaborate comparison results are obtained.

Figure 3:
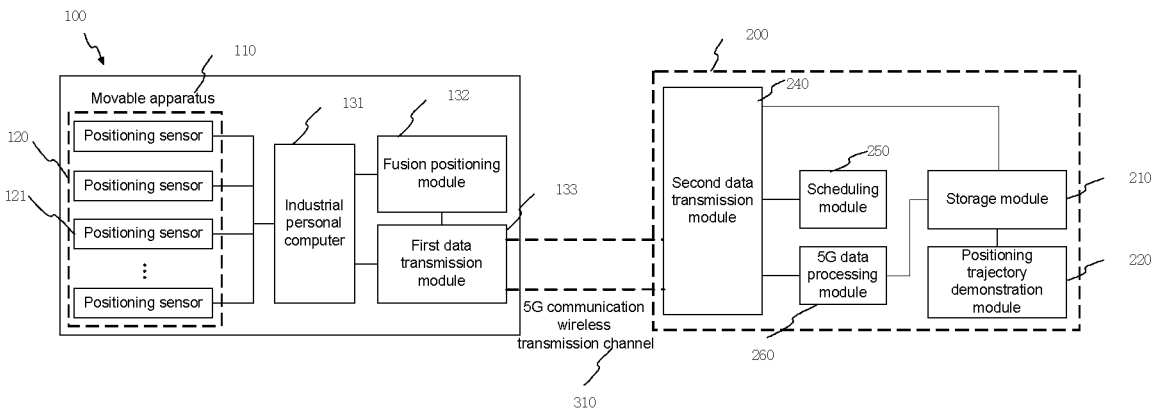
FIG. 3 is a structural block diagram of a positioning calibration system according to still another embodiment.

In another embodiment, as shown in FIG. 3, the data processing apparatus 130 includes an industrial personal computer 131, a fusion positioning module 132, and a first data transmission module 133. The industrial personal computer 131 is provided with a data interface. The industrial personal computer 131 is connected to the positioning sensors 121 by means of the data interface, such that the industrial personal computer 131 can receive in real time the original calibration information of each positioning sensor 121 by means of the data interface, and fuse the original calibration information detected by each sensor, so as to obtain the fusion calibration information. The accuracy of the position coordinate in the fusion calibration information is relatively high, and at least an order of magnitude higher than the accuracy of the position coordinate in the wireless positioning information. The position coordinate in the fusion calibration information may carry the time stamp superior to the millisecond level, such that the time may correspond to the position coordinate of the movable platform 100, thereby achieving the dynamic positioning of the movable platform 100.

The industrial personal computer 131 is also communicatively connected to the fusion positioning module 132 and the first data transmission module 133. The wireless large-bandwidth transmission channel 300 is a 5G communication wireless transmission channel 310. The first data transmission module 133 may include a 5G router. The background processing device 200 further includes a second data transmission module 240 and a 5G data processing module 260. The second data transmission module 240 is communicatively connected to the first data transmission module 133, and is communicatively connected to the 5G data processing module 260 and the storage module 210.

The second data transmission module 240 may be a 5G signal receiving and forwarding device, and may refer to a 5G core network or a 5G base station. The second data transmission module 240 can successfully establish a 5G cell, and form the 5G communication wireless transmission channel 310 between the 5G terminal (which is the first data transmission module 133) and the second data transmission module 240, so as to achieve a large-bandwidth wireless communication. The first data transmission module 133 sends a 5G uplink channel sounding signal (which may also be called a channel SRS) to the second data transmission module 240; and when the first data transmission module 133 sends the 5G uplink channel sounding signal, a 3GPP standard protocol may be followed. The 5G data processing module 260 obtains 5G measurement information of the movable platform 100 according to the 5G uplink channel sounding signal. The 5G measurement information of the movable platform 100 may include angle information of the movable platform 100 and information such as base station coordinate in the second data transmission module 240.

At least one of the positioning sensors 121 is an IMU sensor; and the original calibration information measured by the IMU sensor is further forwarded to the fusion positioning module 132 by means of the industrial personal computer 131. The fusion positioning module 132 is further configured to obtain the wireless positioning information according to the original calibration information measured by the IMU sensor and 5G measurement information. In this embodiment, the wireless positioning information is obtained by using a 5G+IMU fusion positioning technology. Wireless positioning may take a central point of the first data transmission module 133 as a positioning target, that is, the position coordinate in the wireless positioning information may be the coordinate of the central point of the first data transmission module 133. In this embodiment, when the industrial personal computer 131 fuses the original calibration information detected by each positioning sensors 121 so as to obtain the fusion calibration information, a calibrated positioning objective may be the central point of the first data transmission module 133, so as to cause a calibration center to be kept consistent with a wireless positioning center.

The positioning trajectory demonstration module 220 displays the dynamic trajectory of the movable platform 100 according to actual requirements, wherein the dynamic trajectory of the movable platform 100 is generated according to different positioning technologies. For example, a trajectory of which positioning accuracy in the positioning calibration system is the highest may be taken as a calibration trajectory a, a trajectory positioned by a new research 5G+IMU signal is taken as a trajectory b, and a trajectory positioned by the multi-line laser radar is used as a trajectory c. Visualization results of data comparisons can be intuitively and clearly acquired on the basis of the same time, the same environment, and the same objective. The positioning trajectory demonstration module 220 may further support the scale-configurable "enlargement" on the positioning results at the differences between the dynamic trajectories, and support generation of a ranging error distribution curve and the positioning error distribution curve, such that elaborate comparison results are obtained.

In other embodiments, the industrial personal computer 131 may further be configured to directly search a 5G network signal by means of a wireless network card, so as to forward the information such as the original calibration information and the fusion calibration information to the background processing device 200.

In an embodiment, referring to FIG. 2 or 3, the background processing device 200 may further include a scheduling module 250. The scheduling module 250 may be communicatively connected to the second data transmission module 240. The scheduling module 250 is configured to control the movable platform 100 to operate, for example, including controlling the movable apparatus 110 to move, controlling the positioning sensors 121 in the positioning component to start positioning or end positioning, and detecting an operating state of the movable platform 100. Exemplarily, the scheduling module 250 may perform state monitoring and navigation task issuing on the movable platform 100 by means of the 5G communication wireless transmission channel.

In an embodiment, the positioning component 120 includes at least one of a UWB sensor, an IMU sensor, a differential sensor, a video sensor, a Bluetooth sensor, a wireless communication sensor, a laser radar, and a satellite navigation module.

In an embodiment, there are a plurality of movable platforms 100; and the positioning trajectory demonstration module 220 is configured to generate the dynamic trajectory of one or more of the movable platforms 100 on the virtual map.

In an embodiment, the positioning trajectory demonstration module 220 is further configured to monitor the state of the movable platforms 100, and give an alarm when there is an anomaly in the movable platform 100.

The positioning calibration system is integrated with a plurality of positioning sensors 121 for measurement, a plurality of positioning technologies are fused, and massive original measurement data is acquired, such that indoor positioning environments, outdoor positioning environments, or positioning environments switching between indoor and outdoor can be covered without reducing calibration accuracy. Static or dynamic positioning requirements are supported, and calibration requirements of various new research positioning measurement systems are met. In addition, the positioning calibration system supports the unification background processing device 200 to calibrate simultaneously the plurality of movable platforms in different environments, for example, different movable platforms being distributed at all floors, and the area of each floor being above 10,000 square meters, or some movable platform being at an underground parking lot, and some movable platform being at an outdoor parking lot.

By means of the wireless large-bandwidth transmission channel, the positioning calibration system ensures massive data transmission between the background processing device 200 and the movable platform 100. For example, a new generation 5G mobile communication can reach a large bandwidth of 600 MHz by means of carrier aggregation, and a peak rate can at least reach 7 Gbps. A wireless big database constructed in the storage module 210 contributes to timely error correction and repair, innovative thinking, and machine learning during verification of scientific research technologies. In addition, the positioning calibration system supports the setting of frequencies, density and intervals of data collection of the positioning sensors 121, such that measurement data of different specifications is provided for different scientific research experiments.

The positioning calibration system uses a data interface open mode. The data processing apparatus 130 in the movable platform 100 may reserve expansion ports such as RJ45, TTL, RS-232, and RS-485, such that extended integration of the type and number of the positioning sensors 121 can be supported. For example, 5G positioning data in the embodiment in FIG. 2 is taken as a part of the calibration system. Through algorithm optimization and interface processing, the positioning accuracy of the calibration system is improved. In addition, the removing of part of the positioning sensors 121 is also supported. The calibration systems with different accuracies are selected for different positioning accuracy requirements. Through good extendibility, the same positioning calibration system can be integrated with more types of positioning technology combinations, thereby supporting richer measurement calibration scenario requirements.

Functions realized by each apparatus or module in the positioning calibration system may be embodied as codes and/or data, and may be stored in a computer-readable storage device. When processors included in these modules and apparatuses read and execute the codes and/or the data stored on the computer-readable storage device, the processors execute processes embodied by a data structure and the codes stored in the computer-readable storage device.

The positioning calibration system may automatically generate an accurate simulation map (with unlimited dimensions), for example, simulated roads, trees and buildings, by means of technologies such as laser radar scanning or high-definition camera image recognition. The positioning calibration system keep real-time communication with the wireless big database, acquire and display various current positioning method names and coordinate results, and automatically draw a dynamic motion trajectory curve of each positioning method. Researchers may selectively check one of or several positioning trajectories, and may also selectively check trajectory curves in recent period. A history playback function is supported. A VR system visualization environment is supported. By means of matched positioning data and environmental high-definition image data of the movable platform, positioning comparison results are felt more intuitively by wearing VR glasses.

Figure 4:
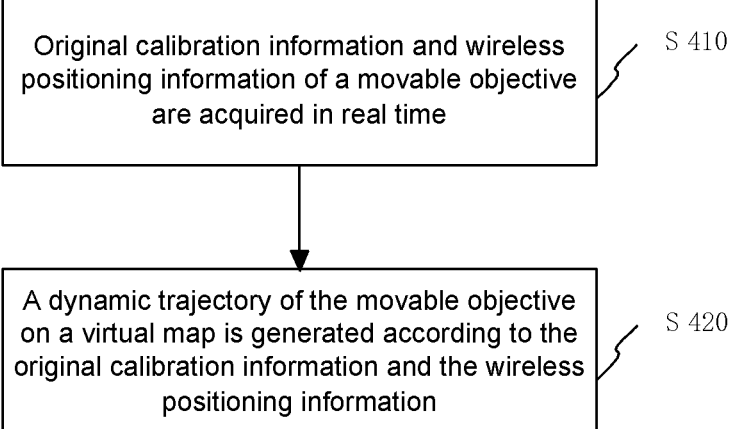
FIG. 4 is a flowchart of a positioning calibration method according to an embodiment.

Further provided in the disclosure is a positioning calibration method. FIG. 4 is a flowchart of a positioning calibration method according to an embodiment. As shown in FIG. 4, the positioning calibration method includes the following steps.

At S410, original calibration information and wireless positioning information of a movable objective are acquired in real time.

The original calibration information is obtained by at least two different types of positioning sensors; and the original calibration information and the wireless positioning information both include position coordinate of the movable objective and the corresponding time stamp when the position coordinate is acquired. The movable objective may refer to a target to be measured, such as a driverless car and a handling robot, or may further refer to a movable platform in the positioning calibration system.

At S420, a dynamic trajectory of the movable objective on a virtual map is generated according to the original calibration information and the wireless positioning information.

The positioning calibration method can improve the universality of positioning calibration, such that a new positioning measurement system can be calibrated under various scenarios. In particular, when the positioning component simultaneously includes the positioning sensors such as the laser radar suitable for indoor positioning, and the positioning sensors such as the satellite navigation module suitable for outdoor positioning, indoor positioning environments, outdoor positioning environments, and positioning environments switching between indoor and outdoor can be covered, such that a wide in covering range is achieved. In addition, the wireless positioning information including the time stamp and the original calibration information of each positioning sensor are acquired in real time, such that real-time dynamic calibration of the positioning measurement system is realized. In addition, data formats measured by different positioning technologies are inconsistent, and data volumes measured within the same time are also different. In this embodiment, coordinate positions measured by different positioning technologies may be converted into the coordinates in the same coordinate system and converted into the same format. The dynamic trajectory of the movable objective is generated according to data of each positioning technology, such that measurement accuracy of each positioning technology in different environments is intuitively analyzed, thereby achieving efficient calibration of the positioning measurement system.

In an embodiment, the positioning calibration method further includes fusing the original calibration information obtained by each positioning sensor, so as to obtain fusion calibration information, wherein the fusion calibration information includes the position coordinate of a movable objective and the corresponding time stamp when the position coordinate is acquired. At least one of a first dynamic trajectory, a second dynamic trajectory, and a third dynamic trajectory of the movable objective on the virtual map is generated according to the fusion calibration information, wherein the first dynamic trajectory is generated according to the original calibration information obtained by each positioning sensor; the second dynamic trajectory is generated according to the fusion calibration information; and the third dynamic trajectory is generated according to the wireless positioning information.

In an embodiment, the positioning calibration method further includes generating a positioning error distribution curve according to the original calibration information, the fusion calibration information, and the wireless positioning information; and/or enlarging a preset position on the virtual map.

In an embodiment, acquiring the wireless positioning information includes: acquiring a 5G uplink channel sounding signal, and obtaining the wireless positioning information according to the 5G uplink channel sounding signal. In another embodiment, at least one of the positioning sensors is an IMU sensor. Acquiring the wireless positioning information includes: acquiring a 5G uplink channel sounding signal; obtaining 5G measurement information of the movable objective according to the 5G uplink channel sounding signal; and fusing the 5G measurement information, and the original calibration information that is measured by the IMU sensor, so as to obtain the wireless positioning information.

In an embodiment, the dynamic trajectory of each movable objective on the virtual map is generated according to the original calibration information and the wireless positioning information of a plurality of movable objectives.

In an embodiment, the positioning calibration method further includes acquiring the state of the movable objective, and giving an alarm when there is an anomaly in the movable objective.

Figure 5:
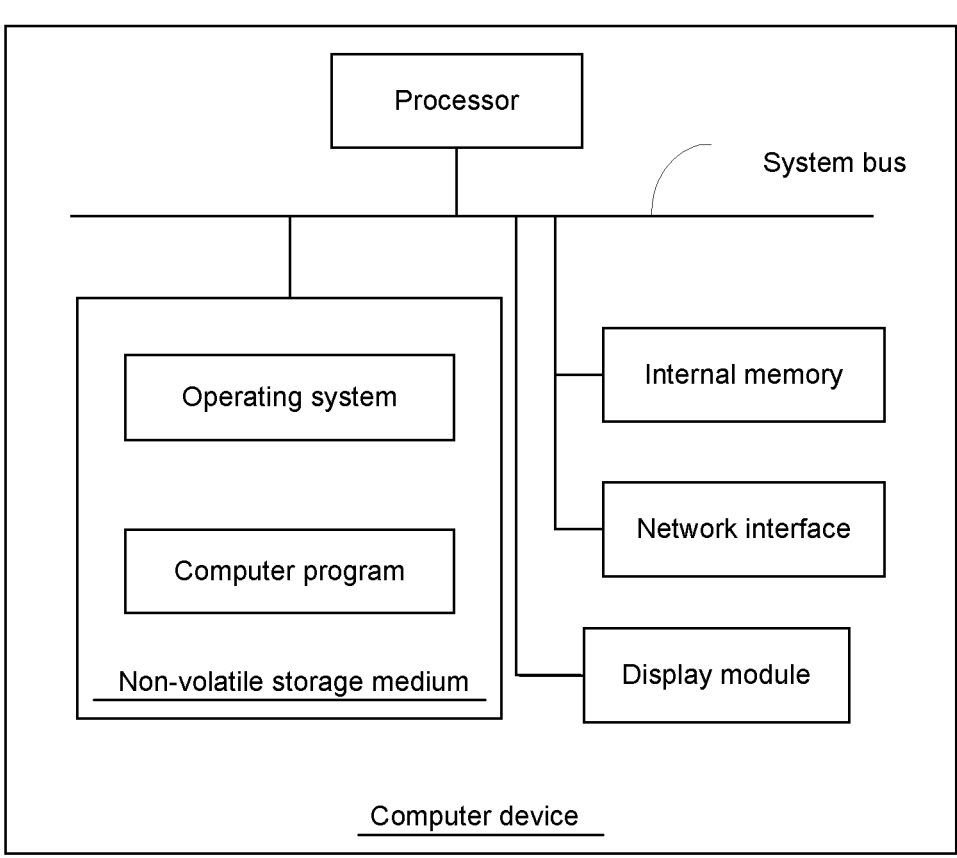
FIG. 5 is a schematic structural diagram of a computer device according to an embodiment.

The method and the system may be implemented in a computer device. An internal structure of the computer device is shown in FIG. 5. The computer device includes a processor, a memory, and a network interface, which are connected by means of a system bus. The processor of the computer device is configured to provide calculation and control capabilities. The memory of the computer device includes a non-volatile storage medium or an internal memory. The non-volatile storage medium stores an operating system and a computer program. The internal memory provides an environment for the running of the operating system and the computer program in the non-volatile storage medium. The network interface of the computer device is configured to be communicatively connected to an external terminal by means of a network. Steps of the positioning calibration method described in any one of the above embodiments are implemented when the computer program is executed by the processor. It may be understood by those skilled in the art that the structure shown in FIG. 5, which is only a block diagram of a portion of the structure associated with the solutions of the disclosure, does not constitute a limitation of the computer device to which the solutions of the disclosure are applied. The specific computer device may include more or fewer components than shown in the figures, or be combined with certain components, or have a different arrangement of components.

An embodiment provides a storage medium, which has a computer program stored thereon. Steps of any one of the methods are implemented when the computer program is executed by a processor.

Those of ordinary skill in the art will appreciate that implementing all or part of the processes in the methods described above may be accomplished by instructing associated hardware by a computer program, which may be stored in a non-volatile computer-readable storage medium, which, when executed, may include processes as embodiments of the methods described above. Any reference to a memory, storage, a database, or other media used in the embodiments provided in the disclosure may include non-volatile and/or volatile memories. The non-volatile memories may include a Read-Only Memory (ROM), a Programmable ROM (PROM), an Electrically Programmable ROM (EPROM), an Electrically Erasable and Programmable ROM (EEPROM), or a flash memory. The volatile memories may include a Random Access Memory (RAM), or an external cache memory. As not a limitation but an illustration, the RAM is available in many forms, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchronous Chain Channel (Synchlink) DRAM (SLDRAM), a Direct Memory Bus Dynamic RAM (DRDRAM), and a Memory Bus Dynamic RAM (RDRAM), among others.

Various technical features of the above embodiments may be combined arbitrarily. For brevity of description, description is not made to all possible combinations of the various technical features of the above embodiments are described. However, all the combinations of these technical features should be considered to fall within the scope of disclosure contained in the specification as long as there is no contradiction between the combinations of those technical features.

The above embodiments merely illustrate several implementations of the disclosure, which are specifically described in detail, but are not to be construed as limiting the scope of the present patent for the disclosure. It should be pointed out that those of ordinary skill in the art can also make some modifications and improvements without departing from the concept of the disclosure, and these modifications and improvements all fall within the scope of protection of the disclosure. Accordingly, the scope of the patent of the disclosure should be subject to the appended claims.

What is claimed is:

1. A positioning calibration system, comprising a movable platform and a background processing device, wherein the movable platform comprises:

a movable apparatus;

a positioning component, provided on the movable apparatus, wherein the positioning component comprises at least two different types of positioning sensors, and the positioning sensors are configured to acquire original calibration information of the movable platform in real time; and a data processing apparatus, provided on the positioning component and connected to the positioning component, wherein the data processing apparatus is configured to acquire wireless positioning information of the movable platform in real time and acquire the original calibration information, and the wireless positioning information and the original calibration information both comprise a position coordinate of the movable objective with a corresponding time stamp when the position coordinate is acquired; and the background processing device comprises:

a storage module, connected to a positioning trajectory demonstration module and configured to store the original calibration information and the wireless positioning information; and the positioning trajectory demonstration module, configured to generate a dynamic trajectory of the movable platform on a virtual map according to the original calibration information and the wireless positioning information, wherein the background processing device is communicatively connected to the data processing apparatus by means of a wireless large-bandwidth transmission channel;

wherein the data processing apparatus is further configured to fuse original calibration information obtained by each positioning sensor, so as to obtain fusion calibration information; and the fusion calibration information comprises the position coordinate of the movable platform and the corresponding time stamp when the position coordinate is acquired;

wherein the positioning trajectory demonstration module is further configured to generate a positioning error distribution curve according to the original calibration information, the fusion calibration information, and the wireless positioning information; and/or, the positioning trajectory demonstration module is further configured to enlarge a preset position on the virtual map.

2. The positioning calibration system as claimed in claim 1, wherein the storage module is further configured to store the fusion calibration information;

the positioning trajectory demonstration module is further configured to generate at least one of a first dynamic trajectory, a second dynamic trajectory, and a third dynamic trajectory of the movable platform on the virtual map;

wherein the first dynamic trajectory is generated according to the original calibration information obtained by each positioning sensor; the second dynamic trajectory is generated according to the fusion calibration information; and the third dynamic trajectory is generated according to the wireless positioning information.

3. The positioning calibration system as claimed in claim 1, wherein the data processing apparatus comprises an industrial personal computer; the industrial personal computer is provided with a data interface and a 5G unit; the industrial personal computer is connected to each positioning sensor by means of the data interface; the wireless large-bandwidth transmission channel is a 5G communication wireless transmission channel;

the background processing device further comprises a second data transmission module and a positioning module; the second data transmission module is communicatively connected to the 5G unit, and is communicatively connected to the positioning module and the storage module;

the industrial personal computer is configured to fuse the original calibration information obtained by each positioning sensor, so as to obtain the fusion calibration information; the industrial personal computer is further configured to send a 5G uplink channel sounding signal to the second data transmission module; and the positioning module is configured to obtain the wireless positioning information according to the 5G uplink channel sounding signal.

4. The positioning calibration system as claimed in claim 1, wherein the data processing apparatus comprises an industrial personal computer, a fusion positioning module, and a first data transmission module; the industrial personal computer is provided with a data interface; the industrial personal computer is connected to each positioning sensor by means of the data interface; the industrial personal computer is further communicatively connected to the fusion positioning module and the first data transmission module; the wireless large-bandwidth transmission channel is a 5G communication wireless transmission channel;

the background processing device further comprises a second data transmission module and a 5G data processing module; the second data transmission module is communicatively connected to the first data transmission module, and is communicatively connected to the 5G data processing module and the storage module;

the industrial personal computer fuses the original calibration information obtained by each positioning sensor, so as to obtain the fusion calibration information;

at least one of the positioning sensors is an Inertial Measurement Unit (IMU) sensor; the first data transmission module is configured to send a 5G uplink channel sounding signal to the second data transmission module; the 5G data processing module is configured to obtain 5G measurement information of the movable platform according to the 5G uplink channel sounding signal; and the fusion positioning module is configured to fuse the 5G measurement information, and the original calibration information that is measured by the IMU sensor, so as to obtain the wireless positioning information.

5. The positioning calibration system as claimed in claim 4, wherein, the background processing device further comprises a scheduling module, wherein the scheduling module is communicatively connected to the second data transmission module and is configured to control the movable platform to operate;

and/or, the scheduling module is configured to control the movable apparatus to move, and control each positioning sensor in the positioning component to start positioning or end positioning, and control to detect an operating state of the movable platform.

6. The positioning calibration system as claimed in claim 1, wherein the positioning component comprises at least one of an Ultra Wide Band (UWB) sensor, an IMU sensor, a differential sensor, a video sensor, a Bluetooth sensor, a wireless communication sensor, a laser radar, or a satellite navigation component.

7. The positioning calibration system as claimed in claim 1, wherein there are a plurality of movable platforms; and the positioning trajectory demonstration module is configured to generate dynamic trajectories of one or more movable platforms on the virtual map.

8. The positioning calibration system as claimed in claim 1, wherein the positioning trajectory demonstration module is further configured to monitor a state of the movable platform, and give an alarm when there is an anomaly in the movable platform.

9. The positioning calibration system as claimed in claim 1, wherein the positioning trajectory demonstration module is configured to display a dynamic trajectory of the movable platform on the virtual map in real time, and/or display a historical dynamic trajectory of the movable platform on the virtual map.

10. A positioning calibration method, comprising:

acquiring original calibration information and wireless positioning information of a movable objective in real time, wherein the original calibration information is obtained by at least two different types of positioning sensors, and the wireless positioning information and the original calibration information both comprise a position coordinate of the movable objective with a corresponding time stamp when the position coordinate is acquired; and generating a dynamic trajectory of the movable objective on a virtual map according to the original calibration information and the wireless positioning information;

wherein the method further comprising: fusing the original calibration information obtained by each positioning sensor, so as to obtain fusion calibration information, wherein the fusion calibration information comprises a position coordinate of a movable objective with a corresponding time stamp when the position coordinate is acquired;

wherein the method further comprising: generating a positioning error distribution curve according to the original calibration information, the fusion calibration information, and the wireless positioning information; and/or enlarging a preset position on the virtual map.

11. The positioning calibration method as claimed in claim 10, further comprising:

generating at least one of a first dynamic trajectory, a second dynamic trajectory, and a third dynamic trajectory of the movable objective on the virtual map, wherein the first dynamic trajectory is generated according to the original calibration information obtained by each positioning sensor; the second dynamic trajectory is generated according to the fusion calibration information; and the third dynamic trajectory is generated according to the wireless positioning information.

12. The positioning calibration method as claimed in claim 10, wherein acquiring the wireless positioning information comprises:

acquiring a 5G uplink channel sounding signal, and obtaining the wireless positioning information according to the 5G uplink channel sounding signal.

13. The positioning calibration method as claimed in claim 10, wherein at least one of the positioning sensors is an Inertial Measurement Unit (IMU) sensor; and acquiring the wireless positioning information comprises:

acquiring a 5G uplink channel sounding signal;

obtaining 5G measurement information of the movable objective according to the 5G uplink channel sounding signal; and fusing the 5G measurement information, and the original calibration information that is measured by the IMU sensor, so as to obtain the wireless positioning information.

14. The positioning calibration method as claimed in claim 10, wherein there are a plurality of movable objectives, and the method further comprises:

generating a dynamic trajectory of each movable objective on the virtual map according to the original calibration information and the wireless positioning information, of each movable objective.

15. The positioning calibration method as claimed in claim 10, further comprising:

acquiring a state of the movable objective, and giving an alarm when there is an anomaly in the movable objective.

16. A computer readable storage medium, having a computer program stored thereon, wherein when the computer program is executed by a processor, the processor is enable to implement following actions:

acquiring original calibration information and wireless positioning information of a movable objective in real time, wherein the original calibration information is obtained by at least two different types of positioning sensors, and the wireless positioning information and the original calibration information both comprise a position coordinate of the movable objective with a corresponding time stamp when the position coordinate is acquired; and generating a dynamic trajectory of the movable objective on a virtual map according to the original calibration information and the wireless positioning information;

wherein the processor is further enable to implement following actions: fusing the original calibration information obtained by each positioning sensor, so as to obtain fusion calibration information, wherein the fusion calibration information comprises a position coordinate of a movable objective with a corresponding time stamp when the position coordinate is acquired;

wherein the processor is further enable to implement following actions: generating a positioning error distribution curve according to the original calibration information, the fusion calibration information, and the wireless positioning information; and/or enlarging a preset position on the virtual map.

* * * * *